Oct. 21, 1952   R. H. MUELLER   2,614,852
VALVE
Filed June 11, 1945
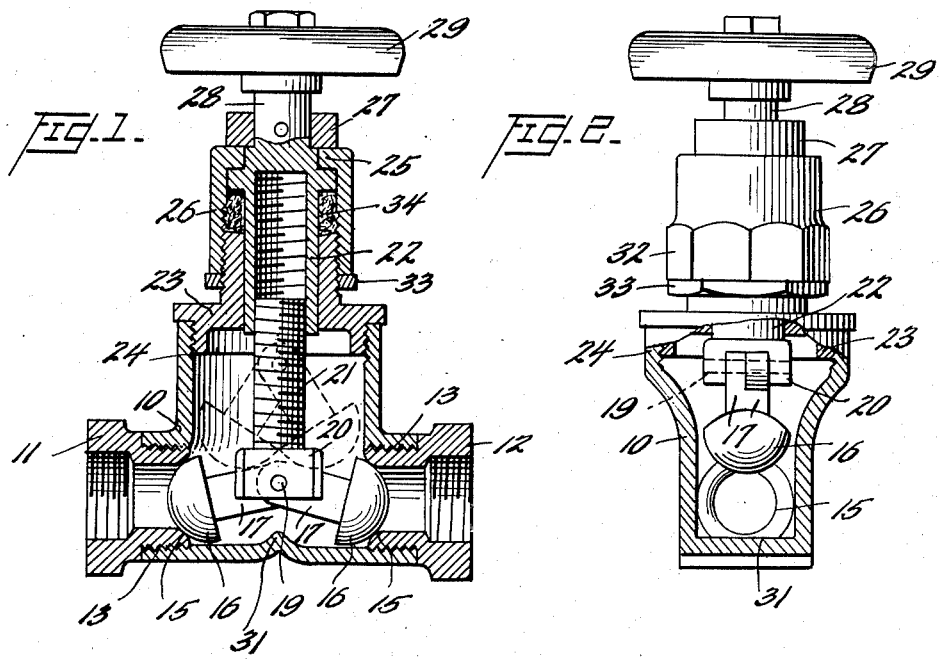
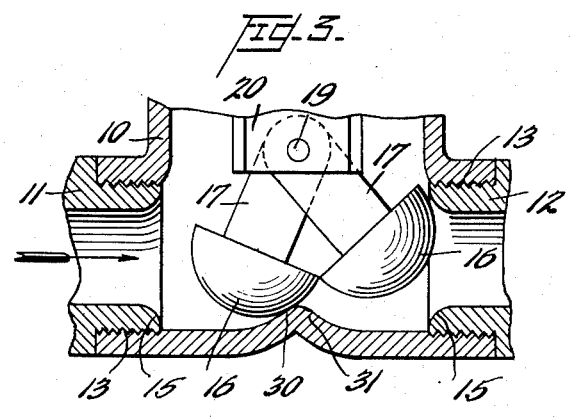
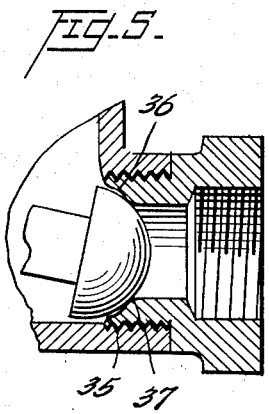
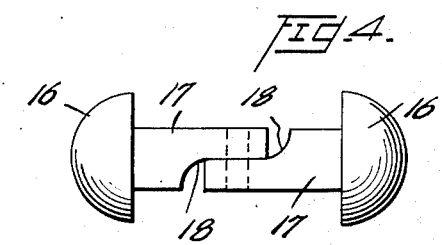
Inventor
Robert H. Mueller,
By Cushman, Darby & Cushman
Attorney Patented Oct. 21, 1952

2,614,852

UNITED STATES PATENT OFFICE 2,614,852

VALVE

Robert H. Mueller, Decatur, Ill., assignor to Mueller Co., Decatur, Ill., a corporation of Illinois Application June 11, 1945, Serial No. 598,681

6 Claims. (Cl. 277—33)

This invention has to do with valves for high pressure services for liquid or gaseous compounds where it is desirable to close, by plural valve members, a plurality of ports, such for example, as inlets and outlets to a valve body.

It has for its purpose to provide a construction in which the valve members are so disposed relative to each other and the valve operating mechanisms, that they may be brought to or withdrawn from their seats simultaneously, the operating mechanisms being such that after an initial seating of the valve members by one mechanism, a supplemental seating force may be imposed by an independent seating mechanism, so as to insure perfect and close seating of the valve members against high pressure.

Further, the construction is such that injury to the valve members or valve seats by reason of accumulations or sedimentation of foreign substance in the valve casing or on the valve seats is avoided and the parts are maintained in proper condition for full efficiency.

These purposes and objects will be clear from the detailed description which follows and in which reference is had to the accompanying drawing, forming part of this disclosure, in which one embodiment of the invention is illustrated.

In the drawing:

Figure 1 is a view in vertical section longitudinally of a valve embodying the invention.

Figure 2 is a view in partial vertical section transversely of the valve, parts being shown in elevation.

Figure 3 is an enlarged view in vertical section longitudinally of the valve showing in detail a portion of the valve body, the valve members, and the valve seats.

Figure 4 is a detail top plan view of the valve members.

Figure 5 is a vertical section longitudinally of a portion of the valve body to show a modified form of valve seat.

Referring to the drawings by numbers, the same numbers designating the same parts in the several views, 10 indicates a valve body having the plug members 11 and 12, either of which may be inlet or outlet, suitably coupled thereto, as, for example, by screw threaded connections 13. As here shown, valve seats 15 are formed at the inner ends of the plugs 11 and 12, which seats are designed to receive the valve members.

The valve members, here disclosed, are identical in makeup and comprise the heads 16 having spherical surfaces to engage the seats 15, and shanks 17 which are cut away at their ends 18 and lapped on each other, as shown in Fig. 4, so as to give a balanced and symmetrical assembly with the longitudinal axes of the two heads 16 coincident or in line with each other. This coupling of the heads insures an equal and simultaneous action of the valve members in their movements to and from their seats.

The shanks 17 of the valve members will be secured together and to the operating mechanism by a pin 19 which passes through the limbs of a shank-receiving forked head 20, the lapped ends of the shanks 17 which engage the fork of the head, providing a pivotal support for the valve members on which they swing freely. The head 20 is carried by threaded rod 21 which is vertically movable in an internally threaded rotatable operating member 22 mounted in a cap plate 23 secured in any suitable manner, as, for example, by the screw threads here shown, to the vertically disposed housing 24 which rises from the body 10 of the valve. The rotatable member 22 is confined between a flange 25 on a thrust cap 26 and a ring 27 pinned or otherwise secured to the stem 28 of the member 22. With this construction the rotatable member 22 may be actuated by a suitable hand wheel 29 or equivalent handle and impart vertical movements to the rod 21 which carries the valve members.

Constructed and operated as described the valve members 16 can be seated and unseated relative to their seats 15 and take either the full line or the dotted line positions shown in Fig. 1, or, if desired, intermediate positions. It will be seen from Fig. 1 that valves 16 may be withdrawn completely within the housing 24 of the valve body, but no jamming of the parts occur, as housing 24 is of sufficient size to take the hinged and collapsed valve heads 16 without contact with its walls. It will be seen from Fig. 3 that when the valve is being unseated and assuming that the pressure flow is in the direction of the arrow, the head 16 nearest the inlet side will be carried to a position where it is almost dead center with the operating rod. To eliminate possibility of jamming on the floor of the body portion 10 and also to prevent the seating face of the head 16 from being scarred or mutilated by any chips, scourings or sediment which might collect at the bottom of the valve body, a stop 30, here shown as a transverse rib 31 formed in the floor of the body portion 10, is provided against which one or the other of the heads 16, dependent on the direction of flow through the body, the left-hand head being shown in Fig. 3, will make point or line contact as the valve members are lowered through the operating mechanism described above. This disposition and functioning of the parts prevents any jamming of the heads against the bottom or floor of the valve body under high pressure surges when the heads approach their seats. The rib 31 will deflect the valve head adjacent the inlet port to substantially a horizontal position corresponding to the position then of the other head, from which both heads may be forced tightly against their respective seats 15. If the floor of the valve body is formed without the rib 31, that is with a level surface, the accumulation of sediment with imbedded steel and iron chips resulting from tapping operations, scale, and other hard particles of foreign matter will cause the head adjacent the inlet port to stick in the sediment and jam upon contact with the floor of the valve, due to its approach in almost a vertical or dead center position in relation to the pivot pin 19, so that it then becomes impossible to force either of the valve heads 16 to its seat; and the chips and other hard particles in the sediment will scar the fine ground finish on the jammed valve head so that thereafter it will fail to tightly shut off the flow in its metal to metal contact with its seat 15.

While the operating mechanism described will satisfactorily seat the valve members for any usual or, in fact, high pressures, provision is made for applying additional pressure where extraordinarily high pressures are encountered. The thrust cap 26 which, as pointed out, supports the rotatable member 22, is threaded for vertical movement on the cap plate 23 of the valve body and has a wrench-engageable formation 32 (see Figs. 1 and 2). The flange 25 on the thrust cap 26 lies, as stated, between the flange on the member 22 and the ring 27 pinned to the stem 28. At its lower end the thrust cap 26 is locked against downward vertical movement by a nut 33 threaded on the cap plate 23 as shown in Fig. 1. If nut 33 is loosened, however, and a wrench applied to the wrench engageable area 32 of thrust cap 26, it may be rotated and when moved downwardly will exert additional pressure on the seated valve members through the member 22 and rod 21. Such supplemental pressure will not effect any appreciable movement of the valve parts, but will set up a high resistance to extreme pressures in the line and serve to set the valve heads more tightly in their seats. It will be obvious that this supplemental valve seating mechanism will not affect in any way the functioning of the valve operating means heretofore described. It will be understood that the movement of the thrust cap 26 in this operation is so slight that it in no way affects the other parts of the assembly, the packing 34, for example, yielding sufficiently to compensate for thrust cap rotary and vertical movement.

In Figure 5 is shown a seat which is so formed as to eliminate likelihood of sediment lodging on the surface of the seat and interfering with the seating of the valves. In the construction here shown no abrupt surfaces are present, against which sediment can accumulate to interfere with the seating of the valves. The seat has a convex surface 35 at its inner extreme end; a concave, easily clearing surface 36 immediately adjacent, and a convex surface 37 at the flow passage, against which last named surface (see Fig. 5) the valve head makes point or line contact. With this form of seat sediment cannot collect at any point on the seat, either at its convex entering end where it engages the valve body; or its concave middle surface, or at its convex flow-passage end against which the valve seats.

The valve seats may be formed separately as threaded plugs 11 and 12 to engage the valve body, usually of brass, to which the flow pipes may be secured, as by screw threads, and they are preferably made of hardened steel. Further, they may be soldered at the threaded portions with solder of high resistance, such as silver solder. If, for some installations, a steel valve body is desired, the separately formed and hardened seat plugs may be threaded in or may be welded in, as thought best.

Such changes from the particular constructions herein disclosed as are within the skill of the mechanic may be made without departing from the range of the invention as defined in the appended claims.

I claim:

1. A high pressure valve comprising a valve body having a port, a valve seat for the port, a valve movable toward and from said seat, rotatable valve operating means, a flanged thrust cap rotatably and vertically movable on said valve body, a circumferential flange on said valve operating means to engage the flange on said thrust cap, a ring on said valve operating means above the flange of said thrust cap to prevent vertical movement of said cap relative to said valve operating means, and a nut adjustably mounted on the valve body below said thrust cap and arranged to abut and to limit vertical downward movement of said cap.

2. A high pressure valve comprising a body portion having an inlet and an outlet, valve seats for said inlet and outlet, independently movable valve members to engage said seats, a valve operating rod to actuate said valve members, means pivotally connecting the valve members to said operating rod on opposite sides thereof, a vertically movable thrust cap on said valve body secured to and movable with said valve operating rod and forming a packing recess between said cap and body, a yieldable packing in said recess, means extending upwardly from the floor of said valve body to deflect the valve members in opposite directions as the operating rod is actuated to move the valve members to their closed position, a flange on said operating rod above said packing engageable by said thrust cap to impart positive axial thrust to and exert additional pressure on said valve members after they have been initially seated by said operating rod, and a stop nut on said body to hold said cap in adjusted positions.

3. A high pressure valve comprising a body portion having an inlet and an outlet and a valve-receiving housing within which valve members may be completely withdrawn, valve seats for said inlet and outlet, independently movable valve members to engage said seats, a valve operating rod formed of two threaded interengaged members to actuate said valve members, means pivotally connecting the valve members to said operating rod on opposite sides thereof, a vertically movable thrust cap threaded on said valve body secured to and movable with said valve operating rod and forming a packing recess between said cap and body, a yieldable packing in said recess, a flange on one of said operating rod members above said packing, means extending upwardly from the floor of said valve body to deflect the valve members in opposite directions as the operating rod is actuated to move the valve members to their closed position, means for engaging said thrust cap with said rod flange to impart positive axial thrust to and exert additional pressure on said valve members after they have been initially seated by said operating rod, and a stop nut on said body to hold said cap in adjusted positions.

4. A high pressure valve comprising a body having a passage provided with an inlet and an outlet, horizontally spaced valve seats for said inlet and outlet, independently movable valve members for engaging said seats, a vertically movable operating rod extending into the body between said valve seats, means pivotally connecting the valve members to said operating rod, said valve members arranged to extend laterally in opposite directions from said operating rod, and means extending upwardly from the bottom of said passage and centrally between said valve seats for engaging and deflecting the valve members to substantially a horizontal position and in alignment with said valve seats as the operating rod is actuated to move the valve members to their closed positions.

5. A high pressure valve comprising a body having a passage provided with an inlet and an outlet, horizontally spaced valve seats for said inlet and outlet, independently movable valve members for engaging said seats, a vertically movable operating rod extending into the body between said valve seats, means pivotally connecting the valve members to said operating rod, said valve members arranged to extend laterally in opposite directions from said operating rod, and an upwardly projecting integral rib formed in the floor of said passage and centrally of said valve seats for engaging and deflecting the valve members to substantially a horizontal position and in alignment with said valve seats as the operating rod is actuated to move the valve members to their closed positions.

6. A high pressure valve comprising a body having a passage provided with an inlet and an outlet, horizontally spaced valve seats for said inlet and outlet, independently movable valve members for engaging said seats, a vertically movable operating rod extending into the body between said valve seats, means pivotally connecting the valve members to the operating rod on opposite sides thereof, a vertically movable thrust cap on said valve body secured to and movable with said valve operating rod and forming a packing recess between said cap and body, a yieldable packing in said recess, means above the packing engaging said thrust cap with said operating rod to impart positive axial thrust to and exert additional pressure on said valve members after they have been initially seated by said operating rod, and means extending upwardly from the bottom of said passage and centrally between said valve seats for engaging and deflecting the valve members to substantially a horizontal position and in alignment with said valve seats as the valves are moved to their closed positions.

ROBERT H. MUELLER.

REFERENCES CITED

The following references are of record in the file of this patent:

UNITED STATES PATENTS

| Number | Name | Date |
|---|---|---|
| 529,302 | Paget | Nov. 13, 1894 |
| 1,314,609 | Sault | Sept. 2, 1919 |
| 1,624,465 | Black | Apr. 12, 1927 |
| 1,935,978 | Harbison | Nov. 21, 1933 |
| 1,976,796 | Milner | Oct. 16, 1934 |
| 2,282,553 | Banowetz | May 12, 1942 |
| 2,401,123 | Volpin | May 28, 1946 |

FOREIGN PATENTS

| Number | Country | Date |
|---|---|---|
| 7,941 | Great Britain | of 1906 |
| 24,639 | Great Britain | of 1902 |